(12) United States Patent
Beyer, Jr.

(10) Patent No.: US 7,805,146 B1
(45) Date of Patent: Sep. 28, 2010

(54) CELL PHONE PDA/GPS COMMUNICATION NETWORK WITH AIS

(76) Inventor: Malcolm K. Beyer, Jr., 92 Lighthouse Dr., Jupiter Inlet Colony, FL (US) 33469-3504

(*) Notice: Subject to any disclaimer, the term of this patent is extended or adjusted under 35 U.S.C. 154(b) by 888 days.

(21) Appl. No.: 11/625,851

(22) Filed: Jan. 23, 2007

Related U.S. Application Data

(63) Continuation-in-part of application No. 11/308,648, filed on Apr. 17, 2006, now Pat. No. 7,630,724, which is a continuation-in-part of application No. 10/711,490, filed on Sep. 21, 2004, now Pat. No. 7,031,728.

(51) Int. Cl.
*H04W 24/00* (2009.01)
(52) U.S. Cl. .................. 455/456.1; 701/213
(58) Field of Classification Search ............. 455/41.2, 455/456.1–456.6, 404.2, 422.1, 413–421, 455/427–431, 550.1, 556.2, 560, 561
See application file for complete search history.

(56) References Cited

U.S. PATENT DOCUMENTS

2001/0039476 A1* 11/2001 Brodie .................. 701/213

2004/0192331 A1* 9/2004 Gorday et al. .......... 455/456.1

* cited by examiner

*Primary Examiner*—Nick Corsaro
*Assistant Examiner*—Amanuel Lebassi
(74) *Attorney, Agent, or Firm*—Malin Haley DiMaggio Bowen & Lhota, P.A.

(57) ABSTRACT

A method, a combined cellular, PDA communication device and system having specialized software applications for allowing a plurality of combined cellular phone/PDA device users to monitor each others' locations and status, to initiate cellular phone calls by touching a symbol on the touch screen display with a stylus which can also include point to call conferencing calling. Each participant's cellular phone/PDA device includes a GPS navigation receiver with application software for point to call cellular phone initiation to participants and geographical entities including vehicles, persons or events, conference calls and video transfers. The method, device and system also includes several features that allow each individual cell phone/PDA device user to interface the automatic identification system (AIS) ship reports and transmissions with cellular IP network participants so that data is exchanged between the AIS carrying ships and cell phone equipped network participants permitting AIS equipped ships to view the location of nearby boats having network cell phones and to allow boats carrying cell phone users to view the locations of AIS equipped ships.

6 Claims, 2 Drawing Sheets

CELL PHONE PDA/GPS COMMUNICATION NETWORK WITH AIS

This application is a continuation-in-part of U.S. patent application Ser. No. 11/308,648 filed Apr. 17, 2006 which is a continuation-in-part of U.S. patent application Ser. No. 10/711,490 now U.S. Pat. No. 7,031,728.

BACKGROUND OF THE INVENTION

1. Field of the Invention

A communications system using a plurality of cellular phones each having an integrated PDA and GPS receiver for the management of two or more people through the use of a communications network. The method and system provide each user with an integrated handheld cellular/PDA/GPS/phone (cell phone device) that has advanced communication software application programs (hereinafter referred to as ACS) and databases used in conjunction with a remote server that enable a user to control the user's cell phone and to remotely control other users' cellular/PDA phones and to establish and integrate ship automatic identification system (AIS) communications into the cellular network so that participants having user cell phones can receive real time information from and interact with the AIS communications network displaying real-time ship movement data.

2. Description of Related Art

The purpose of a communications system is to transmit information bearing digital messages from a source, located at one point, to a user destination, located at another point some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and pending U.S. patent application Ser. No. 11/308,648.

The method and communications system described herein has cell phone/PDA and GPS capabilities that can also send and receive information from the now existing automatic identification system (AIS) that is being used by Class A ships throughout the world and the U.S. Coast Guard. Individual user participants having PDA/cell phones can display on the PDA screen of each user cell phone real-time information concerning ships using the AIS communication system and send real-time user boat movement information with a PDA/cell phone from a user boat to ships operating in the AIS system.

SUMMARY OF THE INVENTION

Applicant's communication system and method described herein is embodied in the advanced communication software (ACS) application programs and database in each PDA/cell phone developed by applicant and installed in the integrated PDA/GPS cell phone devices.

A plurality of cellular phone/PDA/GPS devices each having ACS application programs and databases including charts and maps provides a communication network in conjunction with a remote server with: a) the ability to establish a digital network with other PDA/GPS phone devices and to exchange identity, position and status information that is displayed on the PDA phone's display superimposed on a map with all or selected users equipped with the same cellular phone/PDA software devices so that each of the devices exchange locations, status and other information using pre-stored symbols that represent participants or other items of interest; (b) the ability to display additional information by touching the display screen at a remote phone's location on the PDA display; (c) the ability to make calls to or send data to remote phones by touching their displayed symbols on a map display and selecting the appropriate soft switch; (d) the ability to layer a sufficient number of switches or buttons on the PDA display to perform the above functions without overlaying the map; and (e) the ability to receive real-time AIS transmittal ship data and information from the AIS ship network communication system for displaying information on each user's cell phone device concerning ship traffic and to send users' network information from a user of a cell phone device used on boats to AIS ship users so that the boat identification and location and other navigational data is displayed on the ship AIS displays.

A network server acts as a forwarder for IP communications between any combination of cell phone/PDA users and/or PC based users. Network participant location, identity and status messages are sent to the server by each user. Network participant entered tracks are also sent to the server. Because this data is of interest to all the network participants, the server forwards the data received from one participant to all other participants, thus providing the information necessary for all network participants to know the identity, location and status of all other network participants. The server also communicates over the internet with an AIS ground station server to exchange real-time data on ship movements between applicant's communication network users and AIS users.

The server also acts as a forwarder of data addressed from one participant to one or more addressed participants, thus permitting the transmission of free text, preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, charts and the like).

It is an object of this invention to establish a digital network between PDA/GPS cell phone devices and to enable each participant in the communications net to exchange data with the other net participants and to cause them to report or cease reporting their locations, identity and status on the communication net.

Another object of this invention is to provide a method and a communication system for providing a PDA/cell phone device network of participants having PDA touch screen displays that can also receive and display real-time ship information by monitoring the existing ship AIS communications through the Coast Guard wide area network or another AIS ship location data source permitting each ACS PDA/cell phone user to display the location and additional information concerning all the AIS equipped ships in a particular geographical area and to transmit to the AIS equipped ships the locations of ACS PDA/cell phones located on small vessels or boats that are not equipped with AIS.

In accordance with these and other objects which will become apparent hereinafter, the instant invention will now be described with particular reference to the accompanying drawings.

PREFERRED EMBODIMENT OF THE INVENTION

A method and communication system that joins a communications network of participants using handheld cell phones having integrated PDA and GPS circuitry with ACS application programs that allow a participant having an Advanced Communications Software (ACS) equipped cell phone to activate and control other participants' remote cell phones/PDAs that contain ACS.

Figure 1:
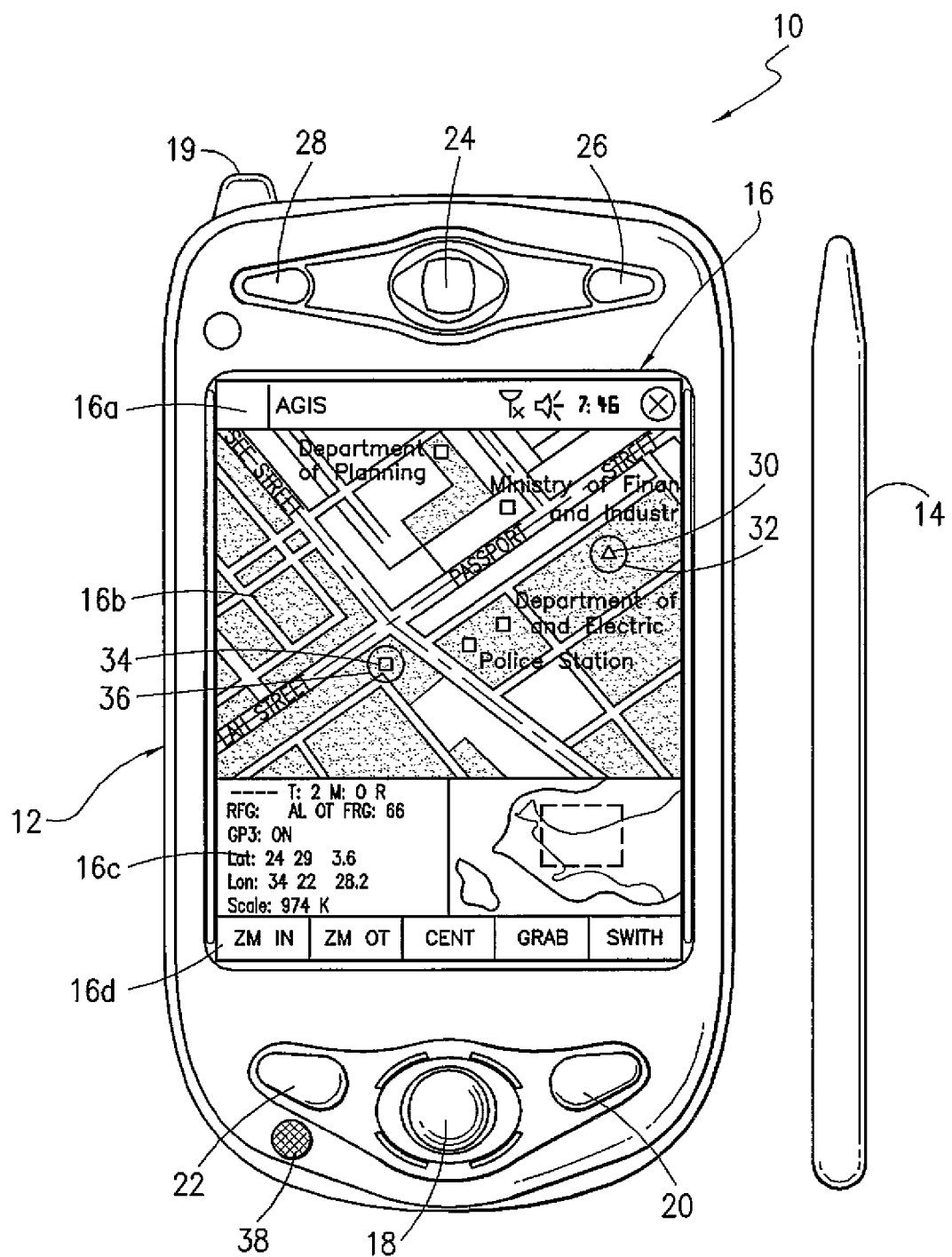
FIG. 1 shows a front plan view of a cellular phone/PDA/GPS having a touch screen.

Referring now to the drawings and, in particular, FIG. 1, a small handheld cellular phone 10 is shown that includes a personal digital assistant (PDA) and a global positioning system receiver (GPS) communications device integrated in housing 12 that includes an on/off power switch 19, a microphone 38, and an LCD display 16 that is also a touch screen system. The small area 16a is the navigation bar that depicts the telephone, GPS and other status data and the active software. Each cell phone includes a CPU and databases that store information useful in the communication network including maps and nautical charts. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude, and through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the applicant's ACS application programs provided in the device. The ACS programs are activated by clicking on an icon on the display to turn the ACS programs on or off. Mounted within housing 12 as part of the PDA is the display 16 and the CPU. The internal CPU includes databases and software application programs that provide for a geographical map, nautical chart and geo-referenced entities, that are shown as display portion 16b, that includes as part of the display various areas of interest in the particular local map or chart section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1, display symbols depicting permanent geographical locations and buildings are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph, nautical chart or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and email address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude display on chart 16b, the user touches the triangle 30 symbol with the stylus 14. The user then touches a "call" software switch from a matrix of displayed soft switches that would overlay the display area 16c. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, a user can call the police station or any other specific geographical facility displayed on the map, including: buildings, locations of people, vehicles, facilities, restaurants, and the like, whose cellular phone numbers (previously stored in the cell phone or network server's database) by touching a specific facility location on the map display using the stylus 14 and then touching the cellular phone call switch. As an example, a user can touch and point to call a restaurant using a soft switch by touching the restaurant location with a stylus and then touching the call soft switch. The cellular phone will then call the restaurant. Thus, using the present invention, each participant can touch and point to call to one or more other net participants symbolically displayed on the map, each of whom has a device as shown in FIG. 1 and can also point to call facilities that had been previously stored in the phone's database. Furthermore, this symbol hooking and soft switch technique can be used to go to a fixed facility's website or to automatically enter the fixed facility's E—mail address in an e-mail.

Each cellular phone/PDA/GPS user device is identified on the map display of the other participant user phone devices by a display symbol that is generated on each user phone display to indicate each user's identity. Each symbol is placed at the correct geographical location on the user display and is correlated with the map on the display. The user of each cellular phone/PDA/GPS device may also enter one or more other fixed entities (buildings, facilities, restaurants, police stations, or the like) and geo-referenced events such as fires, accidents, and other events into its database. This information can be likewise transmitted to all the other participants on the communications net. The map, fixed entities, events and cellular phone/PDA/GPS device communication net participants' latitude and longitude information is related to the "x" and "y" location on the touch screen display map by a mathematical correlation algorithm. Nautical charts used by the Class A ship automatic identification system (AIS) can be displayed on the touch screen as explained below.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the user points at or near the location of a geo-referenced symbol appearing on the cellular phone/PDA display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The user can then read the amplification data that relates to that specific symbol at the specific location. The cell phone user can also select soft switches on the touch screen display to change the primary data and amplification data. Furthermore, the user can use a similar method of hooking and selecting to activate particular soft switches to take other actions which could include: making cellular phone calls, conference calls or 800 number conference calls; sending a free text message, user selected preformatted messages, photographs or videos to the hooked symbol; or dropping an entered symbol.

Each known net participant has a cellular phone number, IP address and, if available, E-mail address that is stored in each participant's device database or the server. To use the communication system, the operator starts the PDA/cellular phone device system by selecting the cell phone and network software which causes: a) the cellular phone to be activated (if it has not already been activated); b) the GPS interface receiver to be established; c) a map of the geographic area where the operator is located and the operator's own unit symbol to appear at the correct latitude and longitude on the map on the display; d) the locations of fixed facilities such as restaurants, hotels, fire departments, police stations, and military barracks, that are part of the database, to appear as symbols on the map; e) the device selected item read out area which provides amplification information for the communication net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or, for VoIP calls, an IP address) from the database. Upon receiving a "call" designation from the soft switch, the operator's device's ACS causes the appropriate phone number or IP number to be called. Upon receiving an indication that the phone number is being called, the application code places a box around the symbol (color, clashed or the like). When the call is connected, the box changes to indicate that the connection is made. When the other party hangs up, the box disappears.

As each of the cell phone participants reports its identity, location and status to the other participants' devices, the received data is geo-referenced and filed in their databases that are accessible by identity and by location. This data is then displayed on each cell phone display. When a request for data is received by touching the display screen, a location search is made by the ACS and a symbol modifier (circle, square, or other symbol) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Thus, a user/operator device is capable of initiating a cellular phone call by touch only, and initiating conference calls by touching the geo-referenced map symbols. Furthermore, by using a similar symbol touching technique, a cellular phone can send operator selected messages to cause a remote cellular phone to display and optionally announce emergency and other messages and to optionally elicit a response from the remote cellular phone.

All of the network participants have the same communication cell phone/PDA/GPS devices described herein. The method and system include the ability of a specific operator device to provide polling in which other cellular phones, using SMS, internet or WiFi, report periodically based on criteria such as time, speed, distance traveled, or a combination of time, speed and distance traveled. The operator can manually poll any or all of the cell phone devices that are used by all of the participants in the communication network having the same devices. The receiving cellular phone application code responds to the polling command with the receiving cellular phone's location and status which could include battery level, GPS status, signal strength and entered track data. Optionally, the phone operators can set their phones to report automatically, based on time or distance traveled intervals or another criterion.

The soft switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the operator the function soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Figure 2:
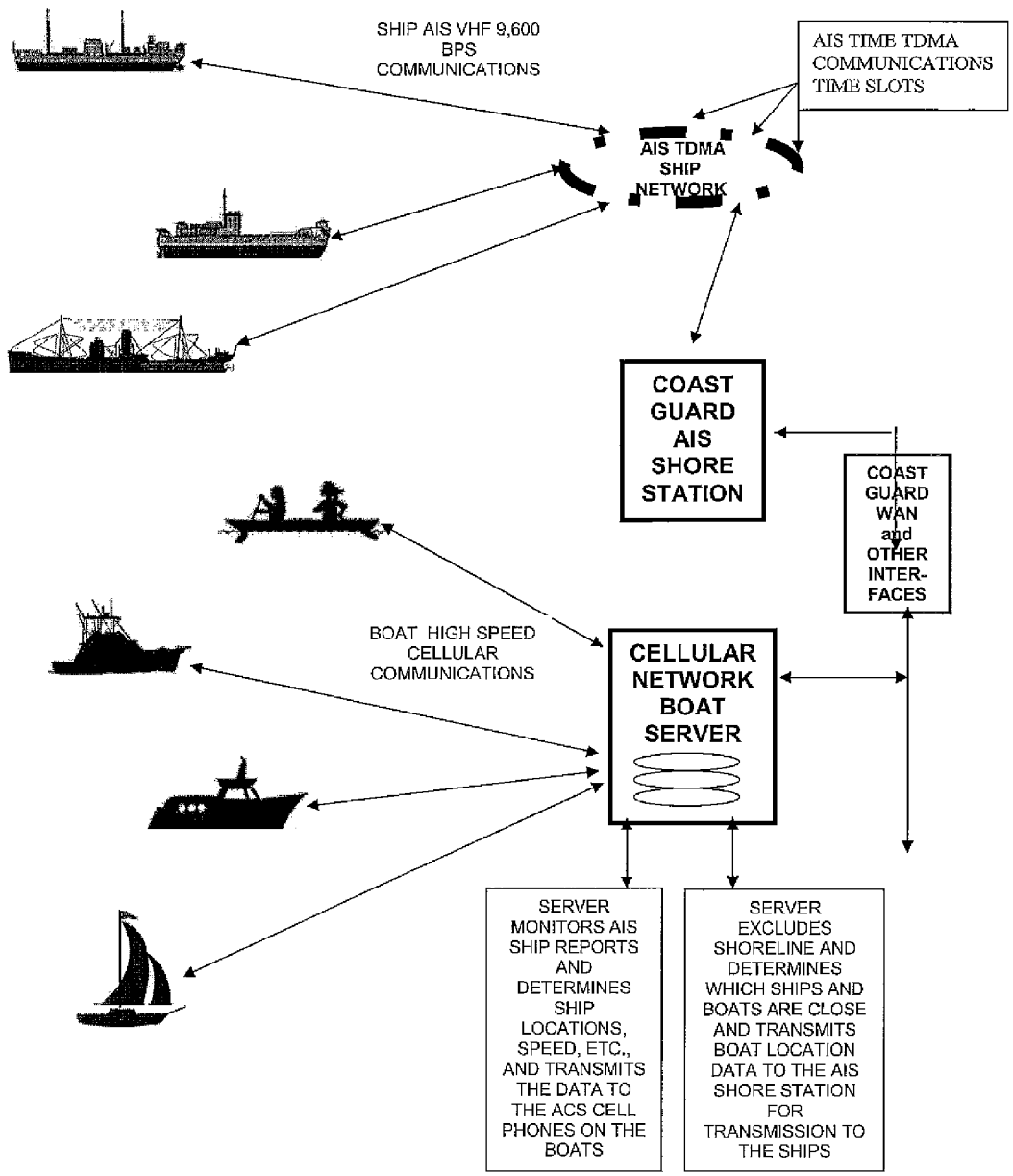
FIG. 2 shows a schematic diagram of a method for the automatic exchange of network participant cellular, WiFi or other high speed communications identity and location data with the Automatic Identification System (AIS) VHF network.

FIG. 2 shows a schematic diagram of a system and method for the automatic exchange of network participant cellular, WiFi or other high speed communications identity and location data with the Automatic Identification System (AIS) VHF TDMA network. AIS transponders are presently required to be on all ships (except warships) of 300 tons or greater. MS provides a communication network between ships that allows a group of ships that are closely located geographically to automatically exchange information concerning location, course, speed, ship name, and other data in order to reduce the likelihood of collision between ships. The AIS TDMA network shown in FIG. 2 provides the data necessary for individual ships to display onboard each ship the name and real time location of all the other ships in the area along with their courses and speeds on computer displays. An AIS system is currently deployed on most large ships throughout the world. At various locations, there are also US Coast Guard and other AIS shore stations, which receive AIS reported ship locations and transmit data to the ships. Furthermore, the AIS shore stations send the ship locations to Coast Guard and other central sites for processing over the internet. The AIS equipment on the ships is relatively large and costly. FIG. 2 depicts a system and method for using small and relatively inexpensive ACS equipped cell phone devices that are located on small vessels (less than 300 tons) to exchange their locations and, when necessary, to have their locations and other data transmitted to an AIS shore station. To accomplish this, each ACS cell phone/PDA (on a boat) transmits its location data to the network Cellular Network Boat Server. The Cellular Network Boat Server verifies that the ACS equipped cell phone's location is over water, beyond the coast line or in a river or inlet by comparing its geo-geo-referenced location with one of several government charts. The Cellular Network Boat Server is also monitoring the ship locations that are reported by the AIS shore stations. The Cellular Network Boat Server determines if the ACS equipped cell phone device located on a boat is near a ship or is on a collision course with the a ship. When either of these criteria is met, the Cellular Network Boat Server reports the location of the boat to the AIS shore station in correct AIS format for retransmission on the AIS network. Since the Cellular Network Boat Server is monitoring the MS shore station's reports of ship locations, the Cellular Network Boat Server can also report MS ship locations to the ACS cell phone devices. Since the cellular data transmission rate is much higher than the AIS data rate, the Cellular Network Boat Server can report all AIS ship locations on the cellular network or just the AIS ship locations that are near the boats equipped with the ACS cell phones/PDAs. Thus, using the communication network cell phone devices, the device display screen could display ships in terms of their courses, speeds and current positions and the ships' AIS display could display the small vessels or boats that are close by or on collision courses.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of interfacing Automatic Identification System (AIS) ship location and ship characteristic data with the cellular or WiFi network participants so that data is exchanged between the AIS and network participants and the cellular or WiFi participants in a network, thus permitting AIS equipped ships to view the location of nearby small vessels having participant cell phones and to allow network participant cell phone users to view the locations of nearby AIS equipped ships comprising the steps of:
   providing a network of PDA/cell phones that include a CPU, a GPS and touch screen display having advanced communication software (ACS) programs that permit exchanging voice and other data including location among all of the cell phone participants;
   providing a ship AIS ship communications network that allows individual ships to communicate with each other within a given geographical area to provide automatically a ship's identification, speed and location in latitude and longitude among all the ships using the AIS system including a shore station for receiving AIS real-time ship information;
   gathering AIS real-time data from said shore station having AIS real-time shipboard data on a first AIS server;
   receiving PDA/cell phone data on a cellular network boat communication server from each user establishing the identification and location of the user and, if moving, the velocity of the user, said cellular network boat communications server being connected to the internet and having access to transmission and receipt of AIS real-time shipboard data for transmitting AIS shipboard data to members of the PDA/cell phone network and transmitting PDA/cell phone network location data to ships having AIS receivers or transponders and AIS displays.

2. A method as in claim 1, including the steps of:
   initiating a signal from a software program in each of the cellular phones to a remote cellular phone causing it to display a pre-stored message and to call the initiating cellular phone;
   activating software in the remote cellular phone causing the remote cellular phone to generate said pre-stored message to the remote cellular phone user;
   selectively causing the identity, position and status reporting among the users equipped with the cellular phone/PDA/GPS system and its associated software; and
   initiating a rapid call to one or more locations whose phone number is available in a geographical referenced database using the touch screen.

3. A method as in claim 2, including the steps of:
   initiating rapid calls to the users of the cellular phone/PDA/GPS network system by touching the recipient's symbol using the touch screen;
   providing initiating rapid calls to fixed sites whose geographical locations and phone number are contained in the phone's or the server's database by touching the recipient's symbol using the touch screen;
   rapidly sending text messages, photographs, and video to another cellular phone by touching the recipient's symbol using the touch screen; and
   initiating rapid conference calling of multiple phones that are contained within the geographical referenced data base by touching the recipient's symbol using the touch screen.

4. A method as in claim 3, including the step of:
   remote controlling one cellular phone/PDA/GPS system to any of the other cellular phone/PDA/GPS system phones, including controlling remote cellular phones to make verbal announcements, display images, place return calls, place calls to another phone number, vibrate, change sound intensity and process and display pre-stored data, images and video.

5. A communication system to provide a cellular phone network for a group of participants, each of the participants having an individual portable cellular phone that includes voice communication, free text and operator selected text messages, photographs and video, a CPU, a GPS navigational system, each of the cellular phones in the communications net of participants containing:
   said CPU and memory;
   touch screen display;
   symbol generator in said CPU that can generate symbols that represent each of the participants in the communication network on the display screen;
   database that stores the individual telephone numbers related to each of the symbols each of which represents a participant in the communication network and fixed site locations;
   cellular phone call initiating software in said CPU connected to the telephone number database and the touch screen and the symbols on the touch screen whereby touching an individual symbol will automatically initiate a cellular phone telephone call to the use represented by the symbol;
   said display including databases that display geographical information that includes showing the geographical location of each of the symbols representing participants in the communication network, fixed locations, and entered items of interest;
   using software to create new or modify old symbols and associate the symbol to a new unused soft switch or a renamed existing soft switches and then down load the new or renamed soft switch to the cell phone and remote cell phone(s) so that they can be used on the cell phone;
   network of PDA/cell phones that include a CPU, a GPS and touch screen display having advanced communication software programs that permit exchanging voice and other data including location among all of the cell phone participants;
   AIS ship communications network that allows individual ships to communicate with each other within a given geographical area to provide automatically a ship's identification, speed and location in latitude and longitude among all the ships using the AIS network including a ground station for receiving AIS real-time ship information;

server that receives AIS real-time ship identification, position and velocity data from said AIS shore station over the internet or by other means and that also receives PDA/cell phone data from each advanced communications software network participant containing its identification, position and velocity data;

said server transmits the AIS real time ship information to the PDA/cell phone cellular or WiFi network using the advanced communication software (ACS) transmission protocol and formats for display on the PDA/cell phone displays;

said server determines based on proximity or closest point of approach which PDA/cell phone cellular network small vessel or boat participants should be transmitted to the AIS shore station in AIS formats for retransmission to AIS equipped ships; and said server transmits the eligible PDA/cell phone cellular network small vessel or boat participant's real time identity and location data to the AIS shore station in AIS formats for retransmission to the AIS network and display on the ship's AIS display.

6. A cellular phone for use in a communication network for a plurality of participants comprising:

cellular phone transmitter and receiver for transmitting and receiving voice communication, free and operator selected text messages, photographs, and video;

small hand held portable housing containing said cellular phone transmitter and receiver;

touch screen display mounted in said housing;

modem connected to said cellular phone transmitter and receiver;

CPU connected to said cellular phone transmitter and receiver;

GPS navigation system connected to said CPU and to said cellular phone transmitter and receiver on said touch screen;

database connected to said CPU that includes the symbol of a list of telephone numbers that relate to specific symbols;

symbol generator connected to said CPU and said database for generating symbols on said touch screen display;

CPU software for causing the exchange of data with other participants with a cellular phone;

call initiating software connected through said CPU and said telephone database and said symbol generator whereby, when a user touches the symbol displayed on a touch screen display, the cellular phone call is automatically made to the cellular phone represented by the symbol;

geographical database connected to said CPU to provide a geographical display on said touch screen representing a defined geographical area that also displays symbols representing each of the participants by latitude and longitude;

network of PDA/cell phones that include a CPU, a GPS and touch screen display having advanced communication software programs that permit exchanging voice and other data including location among all of the cell phone participants;

ship AIS communications network that allows individual ships to communicate with each other within a given geographical area to provide automatically a ship's identification speed and location in latitude and longitude among all the ships using the AIS network including a ground station for receiving AIS real-time ship information;

first AIS server for gathering AIS real-time data from said ground station having AIS real-time shipboard data; and cellular network boat communications server for receiving PDA/cell phone data from each user establishing the identification and location of the user and, if moving, the velocity of the user, said network PDA/cell phone communications server being connected to the internet and having access to transmission and receipt of AIS real-time shipboard data for transmitting and receiving the AIS shipboard data among members of the PDA/cell phone network and the transmission of PDA/cell phone small vessel/boat location data to ships equipped with AIS processing and displays.

* * * * *